Aug. 24, 1948.  E. E. BARR ET AL  2,447,790
BIREFRINGENT SOLID FILM COMPRISING INTIMATE MIXTURE OF MINUTE
PARTICLES OF ISOPHTHALIC ACID AND TEREPHTHALIC
ACID AND METHOD OF MANUFACTURE
Filed April 11, 1945

INVENTORS
Edgar E. Barr and
Cutler D. Hut
BY
Donald L. Brown
Attorney

Patented Aug. 24, 1948

2,447,790

UNITED STATES PATENT OFFICE 2,447,790

BIREFRINGENT SOLID FILM COMPRISING INTIMATE MIXTURE OF MINUTE PARTICLES OF ISOPHTHALIC ACID AND TEREPHTHALIC ACID AND METHOD OF MANUFACTURE

Edgar E. Barr, North Woburn, and Cutler D. West, Cambridge, Mass., assignors to Polaroid Corporation, Cambridge, Mass., a corporation of Delaware Application April 11, 1945, Serial No. 587,684

5 Claims. (Cl. 88—65)

This invention relates to optical elements, and more particularly to new and improved birefringent optical elements and methods of producing the same.

It is one object of the invention to provide a method for producing optically useful films by the simultaneous co-evaporation and deposition in a vacuum of a plurality of organic compounds.

Another object is to provide novel optical elements produced by means of the method of the invention, and particularly to produce a transparent film of substantial thickness which is optically isotropic for light normally incident thereon and highly birefringent for obliquely incident light.

Figure 1:
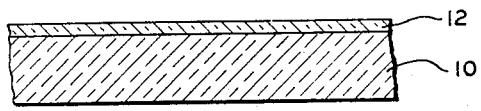
Figure 2:
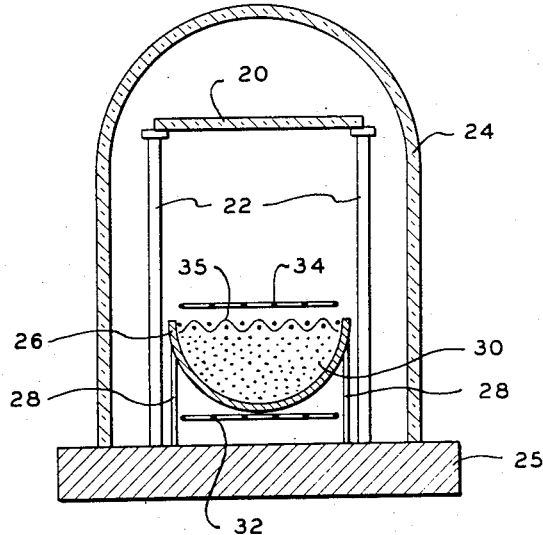

Additional objects and advantages will in part appear and in part be pointed out in the course of the following detailed description of several embodiments of the invention, which are given as nonlimiting examples, in connection with the accompanying drawings, in which:

Figure 1 is a sectional view illustrating diagrammatically an embodiment of the invention; and Figure 2 is a sectional view illustrating diagrammatically apparatus suitable for producing the embodiment of the invention shown in Fig. 1.

One of the problems with which the present invention is particularly concerned is the achievement of maximum transparency and thickness in evaporated films of organic material. For example, if an organic compound such as terephthalic or isophthalic acid is evaporated and the resulting vapor caused to deposit on a supporting surface in high vacuum, there will form on said support a solid, transparent film which will have the optical properties of a basal section of a uniaxial crystal. That is to say, said film will be optically isotropic for light normally incident thereon but relatively highly birefringent for obliquely incident light. However, it is very difficult to maintain transparency in said films. In thicknesses up to, for example, 5 or 10 wavelengths they are substantially glass clear, but in greater thicknesses they become increasingly hazy and ultimately lose all transparency and become wholly diffusing. Since this loss in transparency limits the utility of these films, it is highly desirable to provide means for preventing or reducing it, and the present invention is concerned with this problem.

In accordance with the present invention, it has been discovered that optical elements of the above type but of greatly improved properties with respect particularly to both transparency and thickness can be produced by simultaneously evaporating and depositing in a vacuum a plurality of transparent organic compounds. Fig. 1 illustrates such an optical element, comprising a supporting plate 10 of glass or other suitable material having a transparent, birefringent film 12 formed thereon in accordance with the present invention. For example, film 12 is a heterogeneous mixture of the evaporated and deposited transparent materials, at least one of which is an organic compound the molecules of which are in the form of substantially planar, optically anisotropic groupings and are so oriented as to render said film optically isotropic for light normally incident thereon, and birefringent for light obliquely incident thereon, the optic axis of said film being disposed perpendicularly to the film surface; such a film, for example, may comprise a mixture of isophthalic acid and terephthalic acid, and Fig. 2 illustrates apparatus suitable for use in the preparation of such a film.

Plate 20 in Fig. 2 corresponds to element 10 in Fig. 1 and is illustrated as mounted on any suitable supports 22 within bell jar 24, mounted on any suitable base plate 25. It will be understood that any suitable means, not shown, may be provided for evacuating bell jar 24, and maintaining the desired high vacuum therein during the evaporation process. Crucible 26 may be formed from a non-heat-conducting material such as porcelain or a heat-conducting metal such as stainless steel or nickel, in which case it may be insulated from base plate 25 in any suitable manner, as for example by means of legs 28 of porcelain or other relatively non-heat-conducting material. The charge 30 of material to be evaporated is placed within crucible 26 and heat applied thereto by means of filaments 32 and 34 of any suitable metal and shape, a spiral shape having been found desirable. Filaments 32 and 34 may be supported in any way as by means of the lead wires thereto, not shown, and element 35 represents a relatively fine wire screen, the purpose of which will be described hereinafter.

In practicing the invention with the apparatus shown in Fig. 2, it is desirable that charge 30 be mixed relatively thoroughly before evaporation. For example, charge 30 may comprise 10 parts by weight of isophthalic acid and 1 part of terephthalic acid, and after it has been mixed and placed in crucible 26, bell jar 24 should be evacuated. It is important that evacuation be as complete as possible, and that the vacuum be maintained at a high level throughout the evaporation process. Two factors contribute to this requirement. The first is that in the practice of the present invention there is at least a slight tendency to decomposition of the charge at the temperature of evaporation, and this tendency increases with temperature. At the same time, any decomposition results in a lowering of the vacuum, which in turn raises the temperature necessary for evaporation and hence encourages more rapid decomposition, and these effects are cumulative unless any decomposition products are removed as rapidly as they form. The other factor is related to the same problem and is that organic molecules generally tend to hold a substantial amount of entrapped air or gas which will be released during evaporation and will thereby similarly reduce the vacuum and encourage decomposition. A vacuum as high as $10^{-6}$ mm. of mercury is desirable and for preferred results it should not be permitted to drop below $10^{-4}$ mm. of mercury.

It is highly desirable in carrying out the process of the invention that heat be applied to the charge as uniformly as possible, and for preferred results the entire charge should be heated to the evaporation point before any vaporization begins. It appears that optimum results from the standpoint of uniformity and clarity are obtained when the charge vaporizes and deposits on plate 20 in units as small as possible, i. e., molecules or groups of a very small number of associated molecules. When the vaporization is not uniform there is a tendency for the vaporized material to carry up with it particles of substantially greater than molecular size, and they in turn contribute to loss of clarity and uniformity in the deposited coating. After evaporation begins, the control of heat is somewhat a matter of balance between maintaining the evaporation both rapid and uniform and holding decomposition to a minimum. It is desirable that the control be such that the charge in the crucible sublimes without melting.

The preferred operating range of temperatures for the process of the invention in the above example wherein the charge comprises a mixture of isophthalic and terephthalic acids is approximately 300 to 325° C., but said temperature range may vary relatively widely with different materials and mixtures of materials. It will usually be found more convenient to determine the preferred temperatures of any particular charge by observation, but certain generally applicable considerations may be stated. For example, it appears desirable that the different constituents have evaporation points as nearly uniform as possible, since otherwise there may be a tendency for an unduly large amount of a lower evaporating material to vaporize and deposit before the balance of the charge. It is also desirable to bring the charge as quickly as possible to a temperature at which all constituents will evaporate. It is preferred to avoid combining materials having such different evaporation points that one might be in danger of decomposition at the evaporation point of the other. It should also be noted that as the temperature of the charge rises, decomposition increases until it becomes a serious problem, but in general a safe operating range is from the point at which substantial evaporation begins up to not more than approximately 40° C. higher. Other phases of the relation between temperature and the composition of the charge are discussed hereinafter.

Control of the conditions of evaporation within the desired range may be aided in a variety of ways. For example, the use of a heat-conducting crucible and the two filaments 32 and 34 in Fig. 2 aids in producing uniformly rapid heating of the charge. Screen 36 is of assistance in trapping particles of sizes such that they might affect the quality of the deposited film and is, therefore, preferably of relatively fine mesh. For example, a 200-mesh screen of bronze or stainless steel wire has been found satisfactory. Other factors of importance are the distance and angular relation between plate 20 and crucible 26, which are dependent upon a number of variables. It is desirable to prevent the temperature of the plate from rising too high, approximately 60 to 65° C. being the preferred upper limit, and the plate should therefore not be placed too near the crucible, from 3½ to 4 inches being a preferred minimum distance. It is also preferred that the vaporized particles from the crucible deposit on the plate at as nearly normal incidence as possible, and the relative positions of the plate and crucible should be determined accordingly. For example, if the plate is positioned directly over the crucible as in Fig. 2, its lower surface should be substantially parallel with the top of the crucible and at a distance therefrom which is determined to a considerable extent by their relative sizes. The rate of deposition on any point on the plate is approximately inversely proportional to the square of the distance between said point and the crucible. It follows that the distance between plate and crucible should be correspondingly increased for plates of substantially greater area than the top of the crucible in order that the rate of deposition be as nearly uniform as possible over the entire surface of the plate. If there is a material departure from these conditions, the deposited film may be of non-uniform thickness or the optic axis therein may be non-uniformly disposed, or both of these effects may occur.

The thickness of the deposited film may be readily controlled either visually, if a transparent bell jar is used, or by means of any suitable measuring and control device such as a photoelectric measuring device. The temperature of evaporation depends to a considerable extent upon the particular materials being evaporated and may also vary within the safe operating range as explained above. For a given material and temperature, the time necessary to deposit a film of a given thickness depends on the distance between the crucible and the supporting plate, as is also explained above. As a specific example, if charge 30 comprises a mixture of isophthalic and terephthalic acids and if plate 20 is approximately two inches in diameter and is positioned approximately four inches above and parallel with the top of crucible 26, a film having a thickness of the order of 0.001 inch may be deposited in as little time as from 25 to 30 minutes from the time when heat is first applied to the charge. It is important, moreover, to note that the present invention greatly reduces the time necessary to prepare a film of comparable thickness composed of a single material, owing to the fact that the evaporation can be carried on at a substantially faster rate with the mixed materials without haze formation than is the case with single compounds.

The preferred product of the above process is a substantially glass clear film possessing the optical properties of a basal section of a uniaxial crystal. That is to say, said film will be optically isotropic for light normally incident thereon, but it will exhibit birefringence of a very high order for obliquely incident light, for example a maximum upwards of 0.30 for a mixture of isophthalic acid and terephthalic acid. The films of the invention are self-supporting and quite hard but relatively brittle. They are, therefore, preferably retained in use on the supporting plate whereon they are formed or otherwise protected as by lamination. It should also be noted that the invention is not limited to the use of glass as the support whereon the above films are formed. Any of a variety of other materials may be used, such for example as methyl methacrylate, polystyrene or other similar organic resins, provided they remain sufficiently rigid under the conditions of evaporation.

The above described optical properties of the films of the invention may be explained on the basis that the vaporized charge deposits on plate 20 in the form of individual molecules, small molecular aggregates or microcrystals in such manner that the atomic rings therein lie parallel to the surface of the plate and hence parallel to the surfaces of the film, which readily accounts for the birefringence of the film as well as the direction of its optic axis. Furthermore, examination of said film by X-ray diffraction reveals a pattern characteristic of a fibrous structure, with the fibre axis perpendicular to the plane of the film, and the conclusion is that the film is composed of a multiplicity of microcrystals cohering together to form an integral film and all oriented parallel to a common direction perpendicular to the plane of said film. The above mentioned tendency towards the formation of haze may derive from imperfect cohesion between adjacent microcrystals or from the formation of larger crystals more or less randomly oriented. In any event, the presence in the film of a second crystalline substance very substantially reduces haze formation, possibly by improving cohesion or by reducing the grain size of individual crystals. It is to be expressly understood that the present invention is to be construed as covering all such possible explanations of its operation.

The invention is subject to considerable modification, particularly with respect to the materials used in the practice thereof. It appears that preferred results from the standpoint of high birefringence are obtained with compounds whose molecules contain substantially planar, optically anisotropic groupings such, for example, as aromatic rings of the benzene type. It also appears important that the characteristics of said molecules be such that said anisotropic groupings are readily orientable when the compound is treated in accordance with the invention. This result is apparently most readily obtained when the molecules themselves are substantially rigidly planar, as in the case of isophthalic and terephthalic acids, and it will be seen that this is in accordance with the above discussion of the optical properties of the films of the invention as deriving from uni-planar molecular orientation. Highly satisfactory results from this aspect have been obtained with benzene derivatives, and particularly with mixtures containing isophthalic acid, the birefringence of which in the substantially pure state is of the order of 0.40. Films of optical properties comparable to those of the above described mixture of isophthalic and terephthalic acids have been similarly produced from mixtures of isophthalic acid with, for example, uric acid, xanthine and strychnine. In general, satisfactory results may be obtained with any compound whose molecules are suitably orientable and anisotropic, including non-cyclic compounds having planar molecules which contain unsaturated linkages, and it is to be understood that all specifically mentioned materials are given only by way of illustration and are not to be construed as in any way limiting the scope of the invention. It should particularly be noted that although both isophthalic and terephthalic acids, for example, normally occur in the form of biaxial crystals, the film produced from a mixture thereof as described above is uniaxial. Moreover, this result is not limited to said materials but has been found to take place with other biaxial crystalline materials coming within the scope of the invention.

In general it appears that other limits on the scope of the invention are practical rather than theoretical. For example, preferred results from the standpoint of a high degree of birefringence in the deposited films of the invention will be obtained with starting materials whose molecules are themselves inherently optically anisotropic, as has already been pointed out. Unsaturated compounds are a preferred example of such materials, but it should be expressly understood that the invention does not exclude saturated compounds, although the latter appear less desirable because their refractive indices and birefringence are generally substantially lower than those of the unsaturated compounds. It will be readily apparent that the materials to be evaporated in the practice of the invention should be solid both at room temperature and at any other temperatures under which the deposited film might be used, and it is desirable that said materials have as low vapor pressure as possible. Preferred results have been obtained with relatively highly refractory crystalline compounds, and it may also be desirable to utilize materials which are soluble to a minimum degree in water and any common organic solvent. Another property of importance in selecting starting materials is molecular weight, which should be sufficiently low to permit vaporization without substantial decomposition, and it appears that the practical upper limit of molecular weight is of the order of 1000. It also appears of substantial importance from the standpoint of obtaining high birefringence in the deposited films of the invention to utilize compounds whose molecules contain polar groups, such as the carboxyl and amino groups in the above-noted examples of suitable materials. The presence of such groups appears to influence the deposition of the evaporated molecules in the desired uni-planar orientation. It should also be noted that the invention is not limited to the evaporation of mixed charges wherein all constituents are individually birefringent or crystalline, and films produced as described above and comprising at least one crystalline organic compound and at least one non-crystalline compound are to be construed as coming within the scope of the invention.

In the practice of the present invention the relative proportions of the different materials in the charge to be evaporated do not appear to be critical, and the choice of any particular proportions depends upon a number of variable factors. For example, if it is desired to obtain a maximum degree of birefringence in the deposited film, the most highly birefringent constituent should predominate in the charge, as in the case of isophthalic acid in the foregoing specific example. There is also a relation between the composition of the charge and the operating temperature and composition of the deposited film. In the preferred case all constituents of the charge will have substantially a common evaporation point, and the film will then have substantially the same composition as the charge irrespective of the rate and temperature of evaporation. If said constituents have different evaporation points, the degree to which the composition of the film coincides with that of the mixture will depend to a considerable extent upon the temperature and rate of evaporation, as will be apparent on considering the two extreme cases.

The first case is that in which the constituents of the charge are wholly immiscible in the solid phase, or liquid phase if they melt before evaporation. Under equilibrium conditions their partial pressures will be additive, and the mixture will begin to evaporate at a temperature lower than the constituent of the charge having the lowest evaporation point and will continue to evaporate at a constant relative rate in accordance with their molecular weights as long as some of each material is present, and irrespective of the initial proportions in the charge. The other extreme case is that wherein the different constituents of the charge form a substantially single phase. Under equilibrium conditions the substantially pure constituent having the lowest evaporation point will begin to evaporate first, and the composition of the vapor and film will change progressively until they finally comprise the substantially pure constituent having the highest evaporation point. Since the establishment of equilibrium conditions requires slow heating, it follows that the more rapidly the evaporation is carried out, the more nearly will the charge tend to vaporize like a pure compound and the more nearly the composition of the vapor and film will coincide with that of the charge. This will be true irrespective of the degree of miscibility of the constituents of the charge, and it may accordingly be stated as a general rule that for preferred results the evaporation should be carried out by bringing the entire charge rapidly to as high a temperature as the danger of decomposition permits and maintaining said temperature until a film of the desired thickness is obtained.

The process of the present invention is not limited to the above described embodiment but is subject to substantial variation. In particular it is not limited to evaporation of a mixture of organic compounds, and comparable results may be obtained under some conditions by simultaneously evaporating two or more compounds each from a separate crucible, although this may require more careful control of temperature and the rates of evaporation. In a further modification of the invention there may be evaporated and deposited a series of thin layers as described above but utilizing different materials in each layer. For example, such a composite film may comprise a multiplicity of thin layers of substantially pure isophthalic acid alternating with a multiplicity of layers of terephthalic acid or some other suitable compound. In this embodiment each individual layer may be controlled to the maximum thickness at which adequate transparency is maintained and the composite film built up to the desired ultimate thickness. Still further variations of the above evaporation technique will doubtless be apparent to those skilled in the art and all such modifications are to be construed as coming within the scope of the invention.

Since certain changes in carrying out the above process, and certain modifications in the product which embody the invention may be made without departing from its scope, it is intended that all matter contained in the above description, or shown in the accompanying drawing shall be interpreted as illustrative and not in a limiting sense.

What is claimed is:

1. As a new product, an optical element comprising in combination means providing a supporting surface and a substantially uniform solid film adhering to said surface, said film comprising an intimate mixture of minute particles of isophthalic acid and terephthalic acid, the particles being present in said film in oriented condition whereby said film exhibits an X-ray diffraction pattern characteristic of a fibrous structure with the fibre axis at a predetermined angle to said supporting surface, said particles being oriented with a corresponding optical direction thereof in substantial parallelism with said fibre axis, said film being optically isotropic for light incident thereon in a direction parallel to said fibre axis and being birefringent for light incident thereon at angles to said fibre axis.

2. As a new product, an optical element comprising in combination means providing a supporting surface and a substantially uniform solid film adhering to said surface, said film comprising an intimate mixture of minute particles of isophthalic acid and terephthalic acid, the particles of said acids being present in said film in oriented condition, said particles being oriented with a corresponding optical direction thereof in substantial parallelism and perpendicular to said supporting surface, said film being optically isotropic for light incident thereon in a direction normal to said supporting surface and being birefringent for light incident thereon at angles to said normal direction.

3. In the process of forming a transparent optical element, the steps comprising simultaneously evaporating under vacuum a mixture of isophthalic and terephthalic acids in the proportion of approximately ten parts of isophthalic acid to one part of terephthalic acid at a temperature of approximately 300° to 325° C. and depositing the evaporated mixture on a supporting surface in the form of an intimate mixture of minute particles with a corresponding optical direction oriented in substantial parallelism and perpendicular to a surface of the optical element and continuing said evaporation whereby a film is formed on the supporting surface and the resultant material deposited shows a maximum birefringence of 0.30.

4. As a new product, an optical element comprising in combination means providing a supporting surface and a substantially uniform solid film adhering to said surface, said film comprising an intimate mixture of minute particles of a plurality of evaporatable organic compounds, said compounds comprising isophthalic acid and terephthalic acid and having molecules which contain substantially planar, optically anisotropic groupings, the particles of said compound being present in said film in oriented condition whereby said film exhibits an X-ray diffraction pattern characteristic of a fibrous structure with the fibre axis at a predetermined angle to said supporting surface, said particles being oriented with a corresponding optical direction thereof in substantial parallelism with said fibre axis, said film being optically isotropic for light incident thereon in a direction parallel to said fibre axis and being birefringent for light incident thereon at angles to said fibre axis, the film being of such thickness that it transmits incident light without appreciable scattering and having a maximum birefringence of at least 0.30 for light incident thereon at angles to said fibre axis.

5. As a new product, an optical element comprising in combination means providing a supporting surface and a substantially uniform solid film adhering to said surface, said film comprising an intimate mixture of minute particles of isophthalic acid and terephthalic acid, the particles of said acids being present in said film in oriented condition, said particles being oriented with a corresponding optical direction thereof in substantial parallelism and perpendicular to said supporting surface, said film being optically isotropic for light incident thereon in a direction normal to said supporting surface and being birefringent for light incident thereon at angles to said normal direction and having a maximum birefringence of 0.30 for light incident thereon at angles to said fibre axis.

EDGAR E. BARR.
CUTLER D. WEST.

REFERENCES CITED

The following references are of record in the file of this patent:

UNITED STATES PATENTS

| Number | Name | Date |
|---|---|---|
| 1,235,037 | Judson | July 31, 1917 |
| 1,886,234 | Meissner | Nov. 1, 1932 |
| 1,950,907 | Staud et al. | Mar. 13, 1934 |
| 2,011,553 | Land | Aug. 13, 1935 |
| 2,077,699 | Kline | Apr. 20, 1937 |
| 2,119,400 | Nowak | May 31, 1938 |
| 2,123,902 | Land | July 19, 1938 |
| 2,159,351 | Burns | May 23, 1939 |
| 2,233,442 | Wiley | Mar. 4, 1941 |
| 2,241,365 | Meyer | May 6, 1941 |
| 2,270,323 | Land et al. | Jan. 20, 1942 |
| 2,306,222 | Patnode | Dec. 22, 1942 |
| 2,328,219 | Land | Aug. 31, 1943 |
| 2,338,234 | Dimmick | Jan. 4, 1944 |
| 2,346,247 | Bailey et al. | Apr. 11, 1944 |
| 2,352,085 | Dimmick | June 20, 1944 |

OTHER REFERENCES

Spence Article in Jour. of Physical Chemistry, vol. 43, Oct. 1939, pages 865, 870, to 874, 878. (Photostatic copy in 88–65.)

McNally et al., Jour. of Phy. Chem., vol. 34, Jan.–June 1930, pages 165, 169, 170. (Photostatic copy in 88–65.)

Blodgett Article in Phy. Review, vol. 51, June 1, 1937, pages 964, 968, 969, 970. (Photostatic copy in 88–1 R & R.)